(12) United States Patent
Gilbert

(10) Patent No.: US 10,151,643 B2
(45) Date of Patent: Dec. 11, 2018

(54) THERMAL EVENT INDICATOR FOR AIRCRAFT ENGINE

(71) Applicant: THE BOEING COMPANY, Chicago, IL (US)

(72) Inventor: Eric B. Gilbert, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 186 days.

(21) Appl. No.: 15/243,275

(22) Filed: Aug. 22, 2016

(65) Prior Publication Data

US 2018/0052061 A1    Feb. 22, 2018

(51) Int. Cl.
*G01K 13/00*    (2006.01)
*B64F 5/60*    (2017.01)
(Continued)

(52) U.S. Cl.
CPC ............. *G01K 7/16* (2013.01); *B64D 45/00* (2013.01); *G05B 23/0232* (2013.01); *B64D 2045/009* (2013.01)

(58) Field of Classification Search
CPC ........ G05B 23/024; G05B 2219/37211; G05B 23/0243; G05B 23/0286; G05B 23/0232; G05B 23/0283; G05B 23/0221; G05B 23/0254; B64F 5/60; G01K 13/00; G01K 7/16
(Continued)

(56) References Cited

U.S. PATENT DOCUMENTS 5,431,011 A * 7/1995 Casarella .............. F01N 11/007
                                                         60/274
5,951,611 A * 9/1999 La Pierre ........... G05B 23/0278
                                                         701/32.1
(Continued)

FOREIGN PATENT DOCUMENTS

EP    1122694 A2    8/2001
EP    2884404 A2    6/2015

OTHER PUBLICATIONS

Extended European Search Report for Application No. 17174281.0 dated Nov. 27, 2017, 20 pgs.
(Continued)

*Primary Examiner* — Gail Kaplan Verbitsky
(74) *Attorney, Agent, or Firm* — Toler Law Group, P.C.

(57) ABSTRACT

A method for monitoring thermal events in an aircraft engine compartment includes obtaining first sensor data from a first sensor located within an engine compartment of an aircraft. The method also includes determining a time series moving average based at least in part on a subset of the first sensor data. The time series moving average is indicative of an average temperature rate-of-change of the engine compartment. The method further includes determining a standard deviation of the time series moving average and detecting a trend of temperature rates-of-change that satisfy a rate-of-change criterion. The rate-of-change criterion is based on a multiple of the standard deviation, and the temperature rates-of-change are based on temperatures of the engine compartment. The method also includes generating an alert in response to detecting the trend. The alert is indicative of a thermal event associated with the engine compartment.

20 Claims, 8 Drawing Sheets

(51) Int. Cl.
*G01K 7/16* (2006.01)
*B64D 45/00* (2006.01)
*G05B 23/02* (2006.01)

(58) Field of Classification Search
USPC .......... 702/179, 182, 183, 184, 185; 73/156
See application file for complete search history.

(56) References Cited

U.S. PATENT DOCUMENTS

| | | | | |
|---|---|---|---|---|
| 6,286,992 | B1* | 9/2001 | Kyrtsos | B61K 9/06 |
| | | | | 374/104 |
| 7,333,922 | B2* | 2/2008 | Cannon | G07C 5/008 |
| | | | | 700/108 |
| 7,457,732 | B2* | 11/2008 | Aragones | G05B 17/02 |
| | | | | 700/29 |
| 7,702,447 | B2* | 4/2010 | Volponi | F02C 9/00 |
| | | | | 701/100 |
| 9,555,903 | B2* | 1/2017 | Howard | B64F 5/60 |
| 2004/0180645 | A1* | 9/2004 | Bussan | G01S 5/0221 |
| | | | | 455/404.2 |
| 2008/0154823 | A1* | 6/2008 | Volponi | G05B 17/02 |
| | | | | 706/45 |
| 2011/0078328 | A1* | 3/2011 | Dunsdon | H04L 45/02 |
| | | | | 709/238 |
| 2017/0300029 | A1* | 10/2017 | Oda | G05B 19/19 |
| 2017/0307243 | A1* | 10/2017 | Burt | G05B 19/048 |

OTHER PUBLICATIONS

Ariyur, et al., "Aeroengine Prognostics via Local Linear Smoothing, Filtering and Prediction," 2004, SAE International, 8 pgs.

Boyce, "Gas Turbine Engineering Handbook," 2002, Gulf Professional Publishing, pp. 1-799.

Eklund, et al., "Using Neural Networks and the Rank Permutation Transformation to Detect Abnormal Conditions in Aircraft Engines," 2005 IEEE Mid-Summer Workshop on Soft Computing in Industrial Applications, Helsinki University of Technology, Espoo, Finland, Jun. 2005, 5 pgs.

Kiakojoori, et al., "Dynamic neural networks for gas turbine engine degradation prediction, health monitoring and prognosis," Predictive Analytics Using Machine Learning, 2016, Neural Computer & Applications, Springer, 2157-2192.

Qui, et al., "Evaluation of Filtering Techniques for Aircraft Engine Condition Monitoring and Diagnostics," 2008 International Conference on Prognostics and Health Management, 2008, IEEE, 8 pgs.

* cited by examiner

THERMAL EVENT INDICATOR FOR AIRCRAFT ENGINE

FIELD OF THE DISCLOSURE

The present disclosure relates to a thermal event indicator for an aircraft engine.

BACKGROUND

The Federal Aviation Administration (FAA) requires fire sensors for certified aircrafts. As a non-limiting example, an aircraft certified by the FAA may include a plurality of fire sensors located through the aircraft. In particular, the aircraft may include at least one fire sensor located in an engine compartment. Fire sensors usually include thermistors. Using the thermistors, a system may generate an alert when a detected temperature exceeds a threshold.

SUMMARY

According to one implementation of the present disclosure, a method for monitoring thermal events in an aircraft engine compartment includes obtaining, at a thermal event detection system, first sensor data from a first sensor located within an engine compartment of an aircraft. The method also includes determining a time series moving average based at least in part on a subset of the first sensor data. The time series moving average is indicative of an average temperature rate-of-change of the engine compartment. The method further includes determining a standard deviation of the time series moving average and detecting a trend of temperature rates-of-change that satisfy a rate-of-change criterion. The rate-of-change criterion is based on a multiple of the standard deviation, and the temperature rates-of-change are based on temperatures of the engine compartment. The method also includes generating an alert in response to detecting the trend. The alert is indicative of a thermal event associated with the engine compartment.

According to another implementation of the present disclosure, an aircraft includes a first sensor located within an engine compartment of an aircraft. The first sensor is configured to generate first sensor data. The aircraft also includes a thermal event detection system configured to determine a time series moving average based at least in part on a subset of the first sensor data. The time series moving average is indicative of an average temperature rate-of-change of the engine compartment. The thermal event detection system is further configured to determine a standard deviation of the time series moving average and detect a trend of temperature rates-of-change that satisfy a rate-of-change criterion. The rate-of-change criterion is based on a multiple of the standard deviation, and the temperature rates-of-change are based on temperatures of the engine compartment. The thermal event detection system is further configured to generate an alert in response to detecting the trend. The alert is indicative of a thermal event associated with the engine compartment.

According to another implementation of the present disclosure, a non-transitory computer-readable medium includes instructions for monitoring thermal events in an aircraft engine compartment. The instructions, when executed by a processor, cause the processor to perform operations including obtaining first sensor data from a first sensor located within an engine compartment of an aircraft. The operations also include determining a time series moving average based at least in part on a subset of the first sensor data. The time series moving average is indicative of an average temperature rate-of-change of the engine compartment. The operations further include determining a standard deviation of the time series moving average and detecting a trend of temperature rates-of-change that satisfy a rate-of-change criterion. The rate-of-change criterion is based on a multiple of the standard deviation, and the temperature rates-of-change are based on temperatures of the engine compartment. The operations also include generating an alert in response to detecting the trend. The alert is indicative of a thermal event associated with the engine compartment.

One advantage of the thermal event monitoring maintenance system of the present disclosure is that existing flight safety sensors can be used to detect non-flight safety airplane engine issues, which may facilitate scheduling of maintenance activities. Additionally, the features, functions, and advantages that have been described can be achieved independently in various implementations or may be combined in yet other implementations, further details of which are disclosed with reference to the following description and drawings.

DETAILED DESCRIPTION

Figure 1:
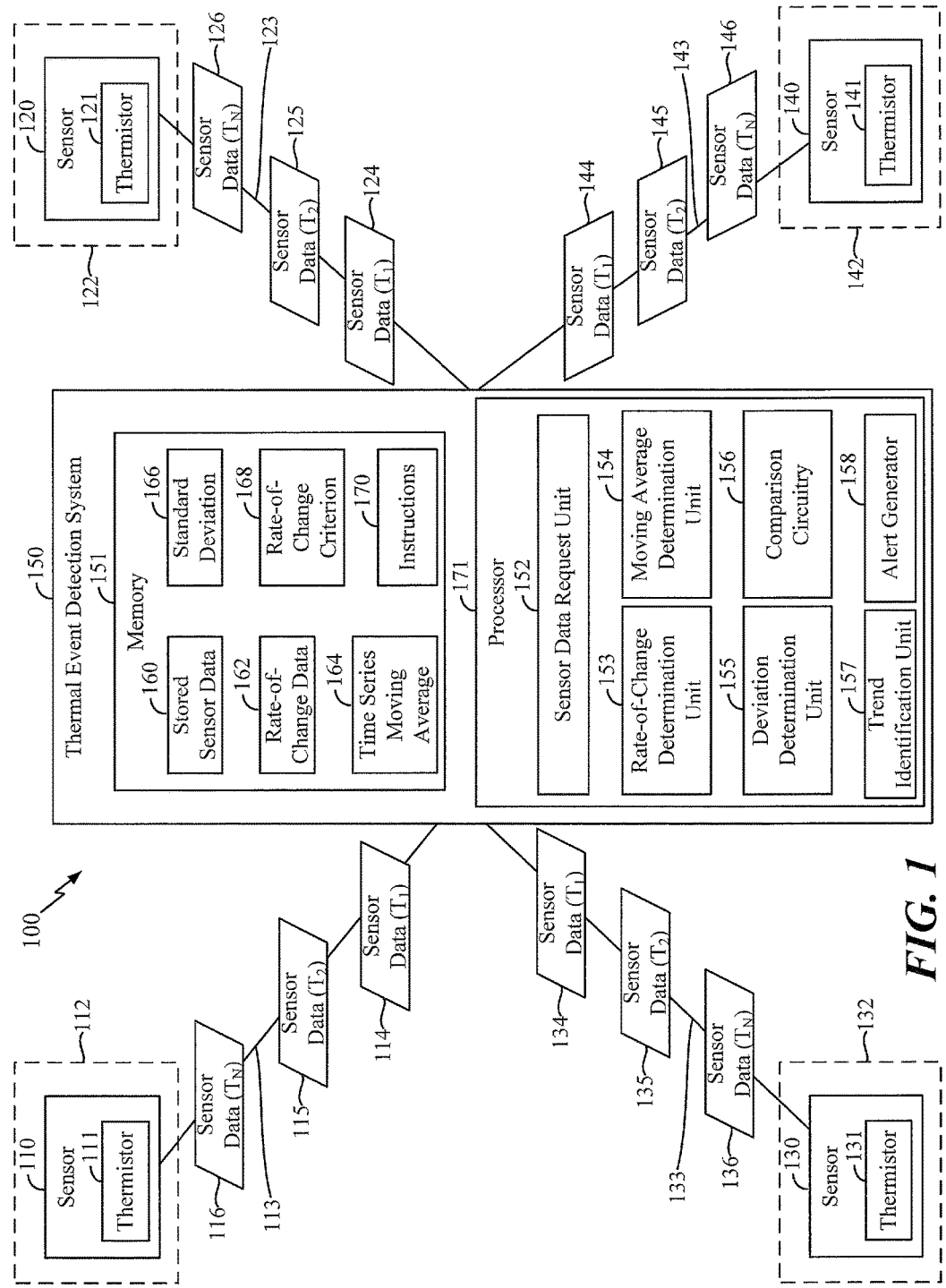
FIG. 1 is a diagram of engine compartment of an aircraft and a computer located remotely from the engine compartment.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein may facilitate scheduling maintenance for non-critical issues on an aircraft. To illustrate, a thermal event detection system may collect (or monitor) sensor data from at least one sensor in the engine compartment. The sensor data may indicate a resistance level of a thermistor included in the at least one sensor. The sensor data may be collected for a flight duration, for a particular collection time period (e.g., thirty minutes, sixty minutes, ninety minutes, etc.), for the lifetime of the aircraft, etc. After the sensor data is collected (or as the sensor data is collected), the thermal event detection system may determine a time series moving average (e.g., a "running average") indicating an average temperature rate-of-change of the engine compartment. For example, the thermal event detection system may determine a temperature rate-of-change for a particular time period using sensor data received from the at least one sensor during the particular time period. After determining the temperature rate-of-change for the particular time period, the thermal event detection system may determine a temperature rate-of-change for the next time period using similar techniques. The time series moving average may be determined by averaging temperature rates-of-change for each time period associated with the collection of sensor data. Thus, the time series moving average may be updated as more sensor data is collected and processed.

The thermal event detection system may calculate a standard deviation of the time series moving average and may compare the temperature rate-of-change during different time periods to the standard deviation (or to a multiple of the standard deviation). Based on the comparison, the thermal event detection may determine whether a trend of consecutive (or substantially consecutive) time periods have temperature rates-of-change that are outside a multiple of the standard deviation. By comparing a number of temperature rate-of-change values for a number of consecutive time periods to the standard deviation, the thermal event detection system enables detection of a trend where consecutive (or substantially consecutive) temperature rates-of-change for consecutive (or substantially consecutive) time periods are outside a multiple of the standard deviation. For example, if four out of five temperature rates-of-change determined for five consecutive time periods (over a five second time interval of comparison, for example) are outside of a multiple of at least twice the standard deviation, a trend is detected of high temperature rates-of-change within a short time interval of comparison. If the thermal event detection system determines that the trend is present, the thermal event detection system may generate an alert for notifying maintenance personnel to troubleshoot or inspect the engine. For example, the thermal event detection system may generate an output to activate an indicia device on an aircraft, such as a light or a visual display, to alert a maintenance crew of an event after completion of a flight. Thus, by identifying trends of substantially large temperature rates-of-change in comparison to the standard deviation of the time series moving average, the thermal event detection system may improve maintenance scheduling.

FIG. 1 is a diagram of engine compartment 100 of an aircraft and a computer located remotely from the engine compartment. The engine compartment 100 includes a sensor 110, a sensor 120, a sensor 130, and a sensor 140. A thermal event detection system 150 (e.g., the computer) may be remotely located from the engine compartment. The sensor 110 is positioned at a location 112 of the engine compartment 100, the sensor 120 is positioned at a location 122 of the engine compartment 100, the sensor 130 is positioned at a location 132 of the engine compartment 100, and the sensor 140 is positioned at a location 142 of the engine compartment 100. Although four sensors 110, 120, 130, 140 are depicted in the engine compartment 100, in other implementations, additional (or fewer) sensors may be included in the engine compartment 100. As a non-limiting example, according to one implementation, the engine compartment 100 may include fifteen sensors positioned at fifteen different locations.

The sensor 110 is coupled to the thermal event detection system 150 via a bus 113. The sensor 110 includes a thermistor 111 that has a resistance value that is dependent on a temperature of the location 112. For example, the resistance value of the thermistor 111 decreases as the temperature of the location 112 increases, and the resistance value of the thermistor 111 increases as the temperature of the location 112 decreases. The sensor 110 may generate sensor data 114, 115, 116 based on the resistance value of the thermistor 111 at different times. To illustrate, the sensor 110 may generate sensor data 114 at a first time ($T_1$), sensor data 115 at a second time ($T_2$), and sensor data 116 at an Nth time ($T_N$). N may be any integer value that is greater than zero. The sensor data 114 may indicate the resistance value (in ohms) of the thermistor 111 at the first time ($T_1$), the sensor data 115 may indicate the resistance value of the thermistor 111 at the second time ($T_2$), and the sensor data 116 may indicate the resistance value of the thermistor 111 at the Nth time ($T_N$). The sensor data 114, 115, 115 may be transmitted from the sensor 110 to the thermal event detection system 150 via the bus 113.

The sensor 120 is coupled to the thermal event detection system 150 via a bus 123. The sensor 120 includes a thermistor 121 that has a resistance value that is dependent on a temperature of the location 122. For example, the resistance value of the thermistor 121 decreases as the temperature of the location 122 increases, and the resistance value of the thermistor 121 increases as the temperature of the location 122 decreases. The sensor 120 may generate sensor data 124, 125, 126 based on the resistance value of the thermistor 121 at different times. To illustrate, the sensor 120 may generate sensor data 124 at the first time ($T_1$), sensor data 125 at the second time ($T_2$), and sensor data 126 at the Nth time ($T_N$). The sensor data 124 may indicate the resistance value of the thermistor 121 at the first time ($T_1$), the sensor data 125 may indicate the resistance value of the thermistor 121 at the second time ($T_2$), and the sensor data 126 may indicate the resistance value of the thermistor 121 at the Nth time ($T_N$). The sensor data 124, 125, 125 may be transmitted from the sensor 120 to the thermal event detection system 150 via the bus 123.

The sensor 130 is coupled to the thermal event detection system 150 via a bus 133. The sensor 130 includes a thermistor 131 that has a resistance value that is dependent on a temperature of the location 132. For example, the resistance value of the thermistor 131 decreases as the temperature of the location 132 increases, and the resistance value of the thermistor 131 increases as the temperature of the location 132 decreases. The sensor 130 may generate sensor data 134, 135, 136 based on the resistance value of the thermistor 131 at different times. To illustrate, the sensor 130 may generate sensor data 134 at the first time ($T_1$), sensor data 135 at the second time ($T_2$), and sensor data 136 at the Nth time ($T_N$). The sensor data 134 may indicate the resistance value of the thermistor 131 at the first time ($T_1$), the sensor data 135 may indicate the resistance value of the thermistor 131 at the second time ($T_2$), and the sensor data 136 may indicate the resistance value of the thermistor 131 at the Nth time ($T_N$). The sensor data 134, 135, 135 may be transmitted from the sensor 130 to the thermal event detection system 150 via the bus 133.

The sensor 140 is coupled to the thermal event detection system 150 via a bus 143. The sensor 140 includes a thermistor 141 that has a resistance value that is dependent on a temperature of the location 142. For example, the resistance value of the thermistor 141 decreases as the temperature of the location 142 increases, and the resistance value of the thermistor 141 increases as the temperature of the location 142 decreases. The sensor 140 may generate sensor data 144, 145, 146 based on the resistance value of the thermistor 141 at different times. To illustrate, the sensor 140 may generate sensor data 144 at the first time ($T_1$), sensor data 145 at the second time ($T_2$), and sensor data 146 at the Nth time ($T_N$). The sensor data 144 may indicate the resistance value of the thermistor 141 at the first time ($T_1$), the sensor data 145 may indicate the resistance value of the thermistor 141 at the second time ($T_2$), and the sensor data 146 may indicate the resistance value of the thermistor 141 at the Nth time ($T_N$). The sensor data 144, 145, 145 may be transmitted from the sensor 140 to the thermal event detection system 150 via the bus 143.

Figure 2:
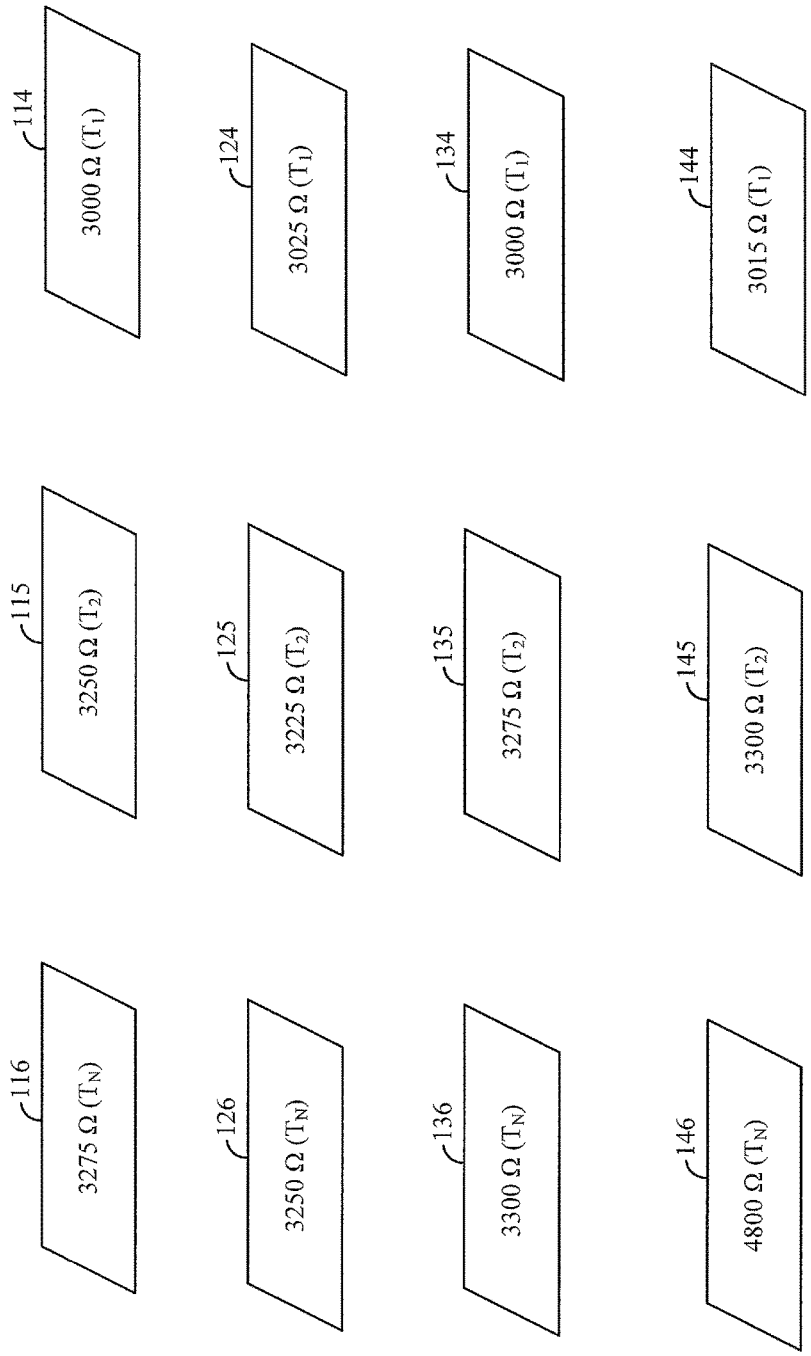
FIG. 2 depicts non-limiting examples of resistance values for sensor data.

Referring to FIG. 2, non-limiting examples of resistance values for the sensor data are illustrated. For example, the sensor data 114 may indicate that the thermistor 111 has a 3000 ohm resistance at the first time ($T_1$), the sensor data 115 may indicate that the thermistor 111 has a 3250 ohm resistance at the second time ($T_2$), and the sensor data 116 may indicate that the thermistor 111 has a 3275 ohm resistance at the Nth time ($T_N$). The sensor data 124 may indicate that the thermistor 121 has a 3025 ohm resistance at the first time ($T_1$), the sensor data 125 may indicate that the thermistor 121 has a 3225 ohm resistance at the second time ($T_2$), and the sensor data 126 may indicate that the thermistor 121 has a 3250 ohm resistance at the Nth time ($T_N$). The sensor data 134 may indicate that the thermistor 131 has a 3000 ohm resistance at the first time ($T_1$), the sensor data 135 may indicate that the thermistor 131 has a 3275 ohm resistance at the second time ($T_2$), and the sensor data 136 may indicate that the thermistor 131 has a 3300 ohm resistance at the Nth time ($T_N$). The sensor data 144 may indicate that the thermistor 141 has a 3015 ohm resistance at the first time ($T_1$), the sensor data 145 may indicate that the thermistor 141 has a 3300 ohm resistance at the second time ($T_2$), and the sensor data 146 may indicate that the thermistor 141 has a 4800 ohm resistance at the Nth time ($T_N$). For ease of illustration, the resistance values indicated in FIG. 2 are used to describe the techniques presented herein. However, it should be understood that the resistance values indicated in FIG. 2 are for illustrative purposes only and should not be construed as limiting.

As described below, the thermal event detection system 150 of FIG. 1 may be configured to process the sensor data received from at least one of the sensors 110, 120, 130, 140 to generate an alert. The thermal event detection system 150 includes a memory 151 and a processor 171. According to one implementation, the memory 151 may be a non-transitory computer-readable medium that stores instructions 170 that are executable by the processor 171. For example, the instructions 170 may be executable by the processor 171 and may cause the processor 171 to process the sensor data received from at least one of the sensors 110, 120, 130, 140 to generate an alert. The processor 171 includes a sensor data request unit 152, a rate-of-change determination unit 153, a moving average determination unit 154, a deviation determination unit 155, comparison circuitry 156, a trend identification unit 157, and an alert generator 158.

The sensor data request unit 152 may be configured to periodically request sensor data from the sensors 110, 120, 130, 140. For example, the sensor data request unit 152 may request that each sensor 110, 120, 130, 140 send sensor data to the thermal event detection system 150 at the first time ($T_1$), the second time ($T_2$), the Nth time ($T_N$), etc. According to one implementation, the sensor data may be requested (and received) within at particular intervals. As non-limiting examples, the sensor data may be requested (and received) every second, every two seconds, every three seconds, every four seconds, or every five seconds. According to another implementation, each sensor 110, 120, 130, 140 may send sensor data to the thermal event detection system 150 at the particular intervals without receiving a request from the sensor data request unit 152. According to one implementation, the sensors 110, 120, 130, 140 may have non-aligned clocks and may send sensor data at different times. For example, the sensor 110 may send the sensor data 114 to the thermal event detection system 150 at the first time ($T_1$), and the sensor 120 may send the sensor data 124 to the thermal event detection system 150 at a time between the first time ($T_1$) and the second time ($T_2$).

Upon receiving sensor data from the sensors 110, 120, 130, 140, the thermal event detection system 150 may store the received sensor data at the memory 151 as stored sensor data 160. To illustrate, the sensor data 114, 124, 134, 144 may be stored at the memory 151 as stored sensor data 160 during a time period associated with the first time ($T_1$), the sensor data 115, 125, 135, 145 may be stored at the memory 151 as stored sensor data 160 during a time period associated with the second time ($T_2$), and the sensor data 116, 126, 136, 146 may be stored at the memory 151 as stored sensor data 160 during a time period associated with the Nth time ($T_N$). As described below, the stored sensor data 160 may be retrieved by other components of the thermal event detection system 150 to generate the alert. According to another implementation, the thermal event detection system 150 may process the sensor data received from the sensors 110, 120, 130, 140 in "real-time" by processing the sensor data upon arrival (e.g., bypassing storage at the memory 151).

For ease of illustration, the following operations of the thermal event detection system 150 are described with respect to the sensor data 114, 115, 116 received from the sensor 110 to determine whether to generate the alert. However, it should be understood that similar operations may be performed with respect to sensor data from the other sensors 120, 130, 140 to determine whether to generate an alert based on data generated for the other locations 122, 132, 142, respectively. Additionally, it should be understood that sensor data received at each time may be averaged to generate an "average temperature" of the engine compartment 100. Similar operations may be performed with respect to the averaged sensor data to generate the alert.

The rate-of-change determination unit 153 may be configured to determine a temperature rate-of-change in the engine compartment 100 (or at different locations 112, 122, 132, 142 of the engine compartment 100) at different time intervals. To illustrate, assume that the N=3 and the sensor data is received at the thermal event detection system 150 in five second intervals. The rate-of-change determination unit 153 may determine the temperature rate-of-change at the location 112 during a first time interval (e.g., the time interval between the first time ($T_1$) and the second time ($T_2$)) by subtracting the resistance value (3000 ohm) indicated by the sensor data 114 from the resistance value (3250 ohm) indicated by the sensor data 115 and dividing the difference by the change in time (e.g., five seconds). Thus, the temperature rate-of-change at the location 112 during the first time interval may be equal to 50 ohm/second. The rate-of-change determination unit 153 may determine the temperature rate-of-change at the location 112 during a second time interval (e.g., the time interval between the second time ($T_2$)

and the third time ($T_3$)) by subtracting the resistance value (3250 ohm) indicated by the sensor data 115 from the resistance value (3275 ohm) indicted by the sensor data 116 and dividing the difference by the change in time (e.g., five seconds). Thus, the temperature rate-of-change at the location 112 during the second time interval may be equal to 5 ohm/second. The rate-of-change determination unit 153 may store rate-of-change data 162 indicating each temperature rate-of-change at the memory 151.

The moving average determination unit 154 may be configured to determine a time series moving average 164 indicative of an average temperature rate-of-change. For example, the temperature rate-of-change for the engine compartment 100 (or for each location 112, 122, 132, 142) may significantly change based on changing external factors, such as climate changes. To ensure that temperature rates-of-change that are no longer relevant (because of changing external factors) are not used in the determination to alert the maintenance crew, the moving average determination unit 154 may be configured to determine the time series moving average 164. As a non-limiting example, the moving average determination unit 154 may determine the time series moving average 164 for the last thirty minutes, sixty minutes, ninety minutes, etc. However, the time series moving average may continually update and may be determined based on a flight duration (including take-off and decent), an aircraft lifetime, a season, etc. The time series moving average 164 may be stored at the memory 151.

As described above, the temperature rate-of-change at the location 112 during the first time interval is equal to 50 ohm/second and the temperature rate-of-change at the location 112 during the second time interval is equal to 5 ohm/second. The time series moving average 164 for the location 112 may indicate the average temperature rate-of-change during the first and second time intervals (e.g., 10 seconds). Thus, the moving average determination unit 154 may determine that the time series moving average 164 for the location 112 may be equal to 27.5 ohm/second (e.g., the average of 50 ohm/second and 5 ohm/second). The time series moving average 164 may be continually updated by averaging in the temperature rates-of-change associated with additional sensor data received from the sensor 110.

The deviation determination unit 155 may be configured to determine a standard deviation 166 of the times series moving average 164. For example, the deviation determination unit 155 may determine the standard deviation 166 for the time series moving average 164 for the location 112 determined at the moving average determination unit 154. The standard deviation 166 may be stored at the memory 151. The deviation determination unit 155 may also be configured to determine a rate-of-change criterion 168 based on the time series moving average 164. For example, after determining the standard deviation 166, the deviation determination unit 155 may multiply the standard deviation 166 by a "flag factor" to determine the rate-of-change criterion 168. The flag factor may be determined based actual airplane data (e.g., cabin temperature data) to substantially avoid false alarms. According to one implementation, the flag factor may be between two and four. The flag factor may be updated based on actual events (e.g., thermal events) via software. The rate-of-change criterion 168 may be stored at the memory 151.

The comparison circuitry 156 may be configured to compare the temperature rates-of-change (e.g., the rate-of-change data 162) to the rate-of-change criterion 168, and the trend identification unit 157 may be configured to determine if there is a trend of substantially consecutive rates-of-change in the rate-of-change data 162 that satisfy the rate-of-change criterion 168. As a non-limiting example, the trend identification unit 157 may determine whether eighty percent of the calculated rates-of-change (e.g., 80 percent of the samples) in a particular sample time period satisfy the rate-of-change criterion 168. The particular sample time period may be five seconds, ten seconds, twenty seconds, etc. It should be understood that eighty percent is merely an illustrative example and should not be construed as limiting. As described in greater detail with respect to FIG. 5, a particular temperature rate-of-change may "satisfy" the rate-of-change criterion 168 if the particular temperature rate-of-change is below a cooling rate-of-change comparator or if the particular temperature rate-of-change is above a heating rate-of-change comparator.

If a trend is identified, the alert generator 158 may generate an alert. Thus, by identifying trends of substantially large temperature rates-of-change in comparison to the standard deviation 166 of the time series moving average 164, the thermal event detection system 150 may improve schemes to inspect or correct thermal events.

Figure 3:
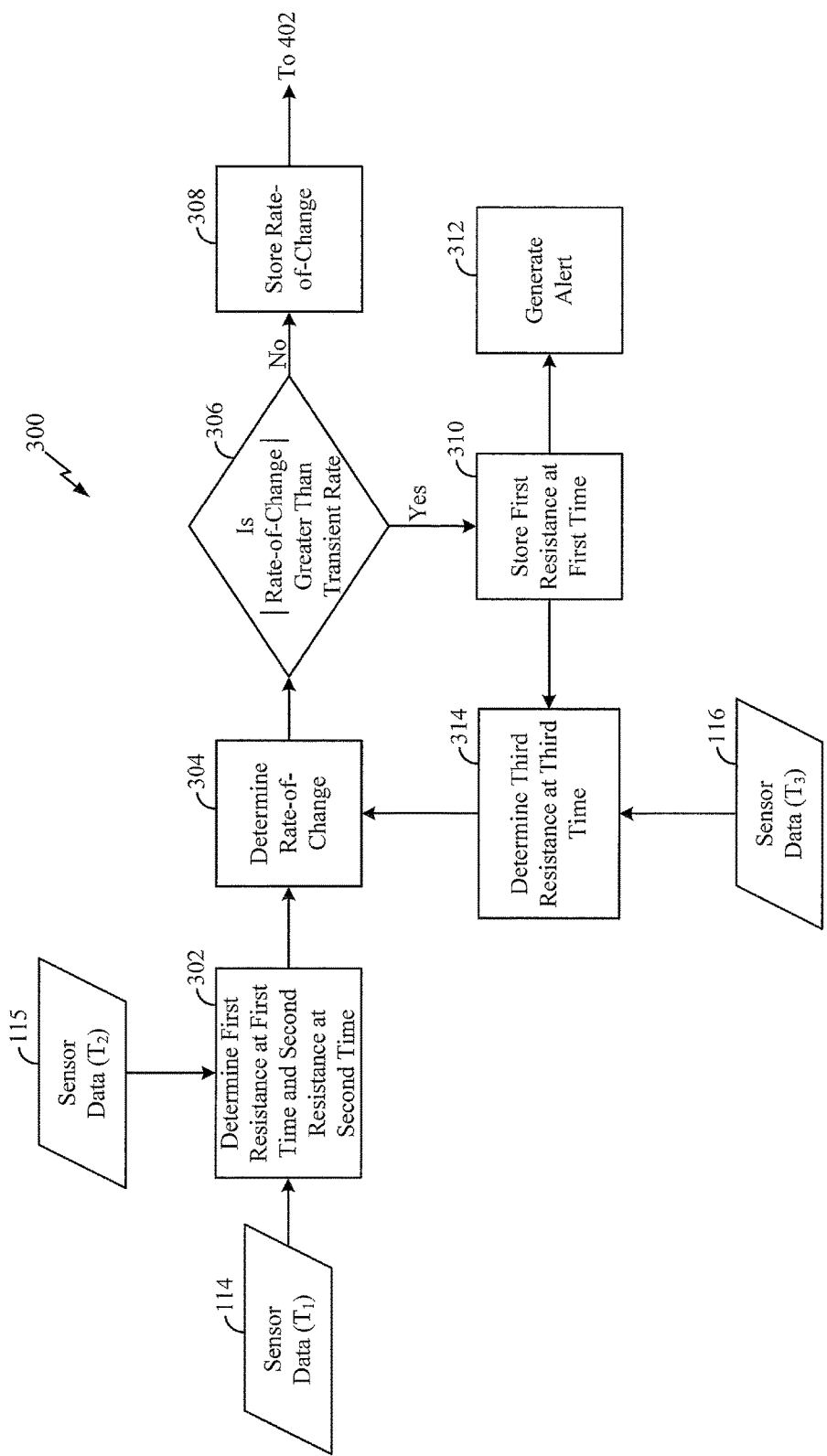
FIG. 3 is a process diagram for generating an alert.

Referring to FIG. 3, a process diagram 300 for generating an alert is shown. The techniques described with respect to the process diagram 300 may be performed by the one or more components of the thermal event detection system 150 of FIG. 1.

At 302, the thermal event detection system 150 may determine a first resistance at a first time and a second resistance at a second time. For example, thermal event detection system 150 may receive the sensor data 114 at the first time ($T_1$) and may receive the sensor data 115 at the second time ($T_2$). The sensor data 114 may indicate the first resistance (3000 ohms) and the sensor data 115 may indicate the second resistance (3250 ohms). At 304, the thermal event detection system 150 may determine a rate-of-change based on the first resistance and the second resistance. For example, the thermal event detection system 150 may determine the rate-of-change during the first time interval (e.g., the time interval between the first time ($T_1$) and the second time ($T_2$)) by subtracting the first resistance (3000 ohm) from the second resistance (3250 ohm) and dividing the difference by the change in time (e.g., five seconds). Thus, the rate-of-change during the first time interval may be equal to 50 ohm/second.

At 306, the thermal event detection system 150 may determine if an absolute value of the rate-of-change is greater than a thermal transient rate (e.g., a thermal maximum transient rate). The thermal transient rate corresponds to a temperature rate-of-change that, when exceeded, is indicative of an error (such as sensor error). For example, the thermal event detection system 150 may compare the absolute value of the rate-of-change (e.g., 50 ohm/second) to the thermal transient rate. If the absolute value of the rate-of-change is not greater than the thermal transient rate, the thermal event detection system 150 may store the rate-of-change, at 308. For example, the thermal event detection system 150 may store the rate-of-change during the first time interval at the memory 151. As described with respect to FIG. 4, the rate-of-change may be stored in a first table (e.g., an increasing temperature table) or a second table (e.g., a decreasing temperature table).

However, if the absolute value of the rate-of-change is greater than the thermal transient rate, the thermal event detection system 150 may store the first resistance associated with the first time ($T_1$), at 310. For example, the thermal event detection system 150 may store the first resistance and the accompanying time stamp (of the sensor data that indicates the first resistance) at the memory 151. Additionally, at 312, the thermal event detection system 150 may generate an alert (e.g., post a noisy signal flag) indicating a thermal event in response to the absolute value or the rate-of-change being greater than the thermal transient rate. At 314, the thermal event detection system 150 may determine a third resistance at a third time. For example, thermal event detection system 150 may receive the sensor data 116 at the third time ($T_3$). The sensor data 116 may indicate the third resistance (3275 ohms). After the third resistance is determined, the thermal event detection system 150 may determine the rate-of-change between the first resistance (stored at the memory 151) and the third resistance, at 304. Thus, if the sensor data 115 is faulty (causing the absolute value of the rate-of-change to be greater than the thermal maximum transient rate), the thermal event detection system may determine a more accurate rate of change using the sensor data 114 and the sensor data 116. However, an alert may be generated to notify maintenance in case the sensor data 114 is not faulty the temperature is changing at a significant rate.

The process diagram 300 of FIG. 3 may enable the thermal event detection system 150 to generate an alert if a rate-of-change associated with a temperature in the engine compartment 100 is significantly high (indicating an increased likelihood of an extreme heating event to occur) or is significantly low (indicating an increased likelihood of an extreme cooling event to occur). For example, if the absolute value of the rate-of-change is greater than the thermal maximum transient rate, the temperature of the engine compartment 100 (or the temperature of particular locations 112, 122, 132, 142) may be changing at a rate that is significant enough to notify maintenance to inspect or troubleshoot a location in the engine compartment. The process diagram 300 also enables the thermal event detection system 150 to store calculated rates-of-change for further processing, as described with respect to FIGS. 4 and 5.

Figure 4:
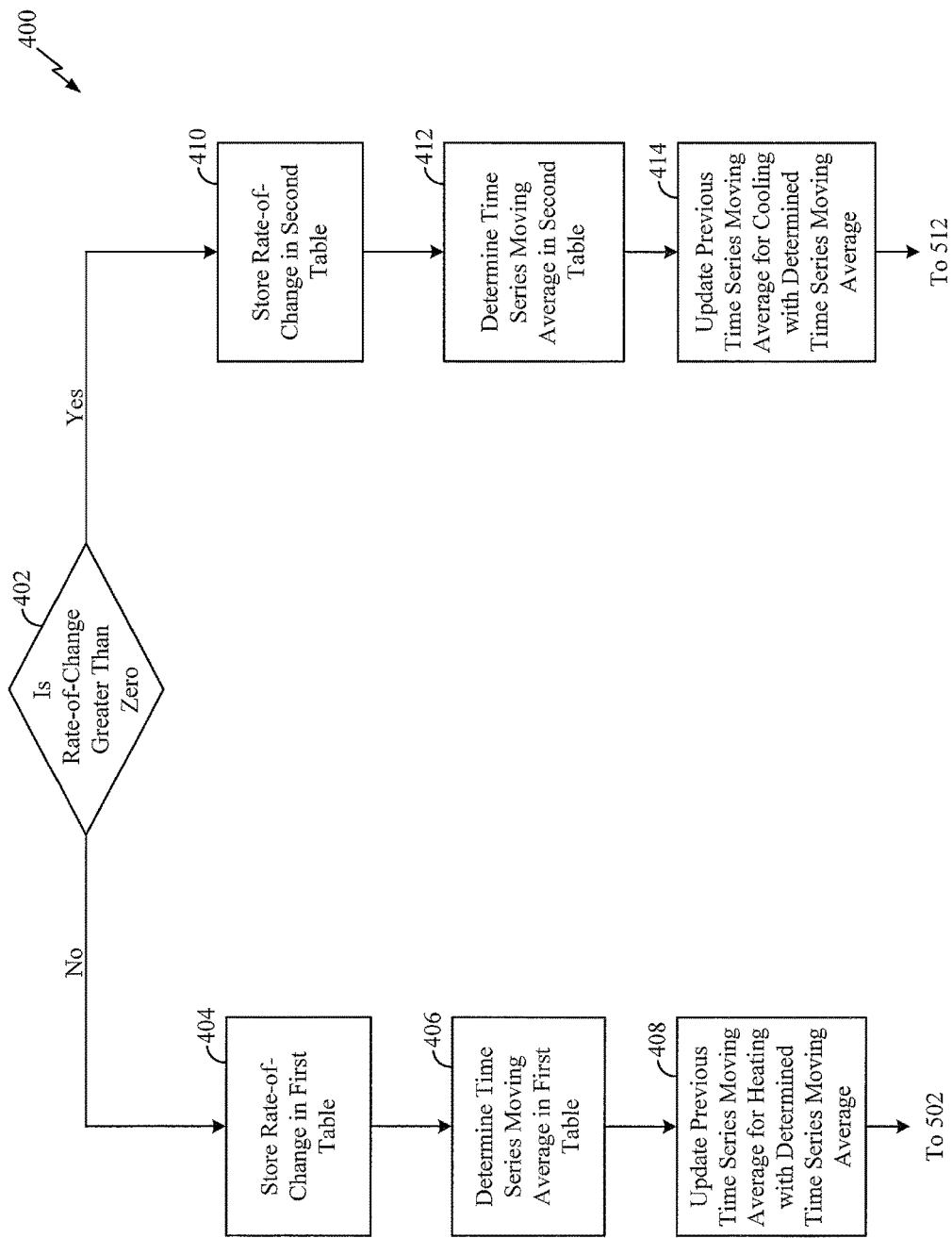
FIG. 4 is a process diagram for determining a time series moving average.

Referring to FIG. 4, a process diagram 400 for determining a time series moving average is shown. The techniques described with respect to the process diagram 400 may be performed by the one or more components of the thermal event detection system 150 of FIG. 1.

At 402, the thermal event detection system 150 may determine if the rate-of-change (determined at 304) is greater than zero. For example, if the rate-of-change is greater than zero, the rate-of-change indicates a decrease in temperature at the engine compartment 100 (or at particular locations 112, 122, 132, 142). If the rate-of-change is not greater than zero, the rate-of-change indicates an increase in temperate at the engine compartment 100 (or at particular locations 112, 122, 132, 142).

If the rate-of-change is not greater than zero, the thermal event detection system 150 may store the rate-of-change in a first table (e.g., an increasing temperature table), at 404. The first table may also be stored (e.g., located) in the memory 151. At 406, the thermal event detection system 150 may determine a time series moving average for each rate-of-change stored in the first table. For example, the moving average determination unit 154 may determine the time series moving average for decreasing rates-of-change during a particular duration. The particular duration may include a flight duration (including take-off and decent), a particular time period (e.g., thirty minutes, sixty minutes, ninety minutes, etc.), an aircraft lifetime, a season, etc. At 408, the thermal event detection system 150 may update a previous time series moving average, for heating with the time series moving average determined at 406. As described with respect to FIG. 5, an alert may be generated based on the updated time series moving average.

If the rate-of-change is greater than zero, the thermal event detection system 150 may store the rate-of-change in a second table (e.g., a decreasing temperature table), at 410. The second table may be stored (e.g., located) in the memory 151. At 412, the thermal event detection system 150 may determine a time series moving average for increasing rates-of-change for each rate-of-change stored in the second table. For example, the moving average determination unit 154 may determine the time series moving average for a particular duration. The particular duration may include a flight duration (including take-off and decent), a particular time period (e.g., thirty minutes, sixty minutes, ninety minutes, etc.), an aircraft lifetime, a season, etc. At 414, the thermal event detection system 150 may update a previous time series moving average for cooling with the time series moving average determined at 412. As described with respect to FIG. 5, an alert may be generated based on the updated time series of moving averages.

The process diagram 400 of FIG. 4 may enable a time series moving average for increasing rates-of-change to be generated and a time series moving average for decreasing rates-of-change to be generated. As described with respect to FIG. 5, each time series moving average may be used by the thermal event detection system 150 to compute respective standard deviation. The thermal event detection system 150 may compare the temperature rate-of-change during different time periods to the standard deviation (or to a multiple of the standard deviation). Based on the comparison, the thermal event detection 150 may determine whether a trend of consecutive (or substantially consecutive) time periods have temperature rates-of-change that are outside a multiple of the standard deviation. If the thermal event detection system 150 determines that the trend is present, the thermal event detection system 150 may generate an alert. Thus, by identifying trends of substantially large temperature rates-of-change in comparison to the standard deviation of the time series moving average, the thermal event detection system 150 may increase the likelihood of detecting potential thermal events associated with the engine compartment.

Figure 5:
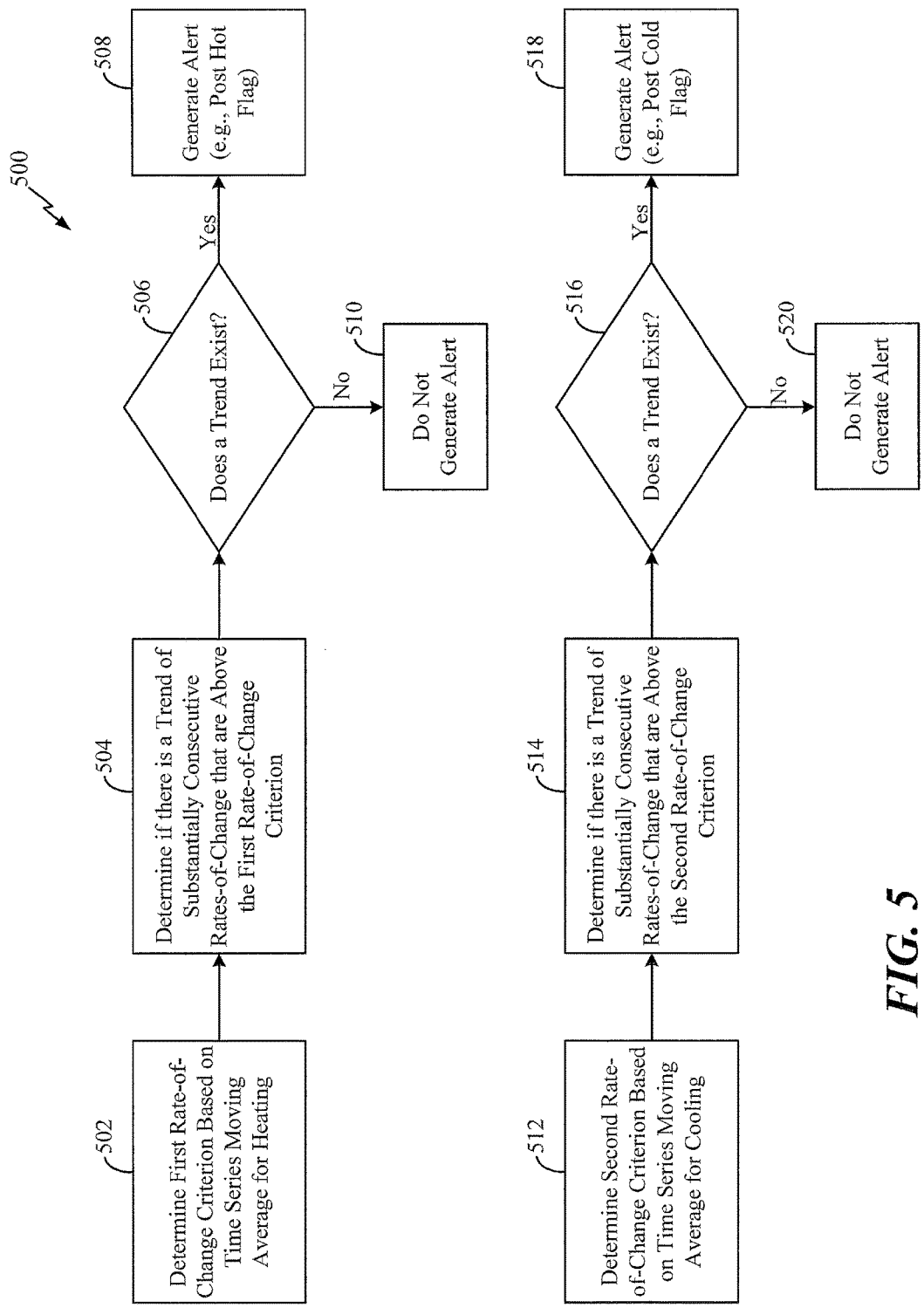
FIG. 5 is a process diagram for generating an alert.

Referring to FIG. 5, a process diagram 500 for generating an alert is shown. The techniques described with respect to the process diagram 500 may be performed by the one or more components of the thermal event detection system 150 of FIG. 1.

At 502, the thermal event detection system 150 may determine a first rate-of-change criterion based on the time series moving average for heating. For example, the deviation determination unit 155 may compute a standard deviation for the time series moving average determined at 406 (and updated at 408). After determining the standard deviation, the deviation determination unit 155 may multiply the standard deviation by a "flag factor" to determine the first rate-of-change criterion. The flag factor may be determined based actual airplane data (e.g., cabin temperature data) to reduce false alarms. According to one implementation, the flag factor may be between two and four. The flag factor may be updated based on actual events (e.g., thermal events) via software.

At 504, the thermal event detection system 150 may determine if there is a trend of substantially consecutive rates-of-change that are above the first rate-of-change criterion. As a non-limiting example, the trend identification unit 157 may determine whether eighty percent of the calculated rates-of-change (e.g., 80 percent of the samples)

in a particular sample time period are above the first rate-of-change criterion. The particular sample time period may be five seconds, ten seconds, twenty seconds, etc. It should be understood that eighty percent is merely an illustrative example and should not be construed as limiting. At 506, the trend identification unit 157 may determine if the trend exist. If the trend is identified, the alert generator 158 may generate an alert (e.g., post a "hot flag"), at 508. Maintenance may be notified to schedule troubleshooting or inspection of a location in the engine compartment. Thus, by identifying trends of substantially large temperature rates-of-change in comparison to the standard deviation of the time series moving average, the thermal event detection system 150 may generate alerts to schedule troubleshooting or inspection. If no trend is identified, the alert generator 158 may bypass alert generation, at 510.

At 512, the thermal event detection system 150 may determine a second rate-of-change criterion based on the time series moving average for cooling. For example, the deviation determination unit 155 may compute a standard deviation for the time series moving average determined at 412 (and updated at 414). After determining the standard deviation, the deviation determination unit 155 may multiply the standard deviation by the flag factor to determine the second rate-of-change criterion.

At 514, the thermal event detection system 150 may determine if there is a trend of substantially consecutive rates-of-change that are below the second rate-of-change criterion. As a non-limiting example, the trend identification unit 157 may determine whether eighty percent of the calculated rates-of-change (e.g., 80 percent of the samples) in a particular sample time period are below the second rate-of-change criterion. At 516, the trend identification unit 157 may determine if the trend exist. If the trend is identified, the alert generator 158 may generate an alert (e.g., post a "cold flag"), at 518. Maintenance may be notified to schedule troubleshooting or inspection of a location in the engine compartment. Thus, by identifying trends of substantially large temperature rates-of-change in comparison to the standard deviation of the time series moving average, the thermal event detection system 150 may generate alerts to schedule troubleshooting or inspection. If no trend is identified, the alert generator 158 may bypass alert generation, at 520.

Figure 6:
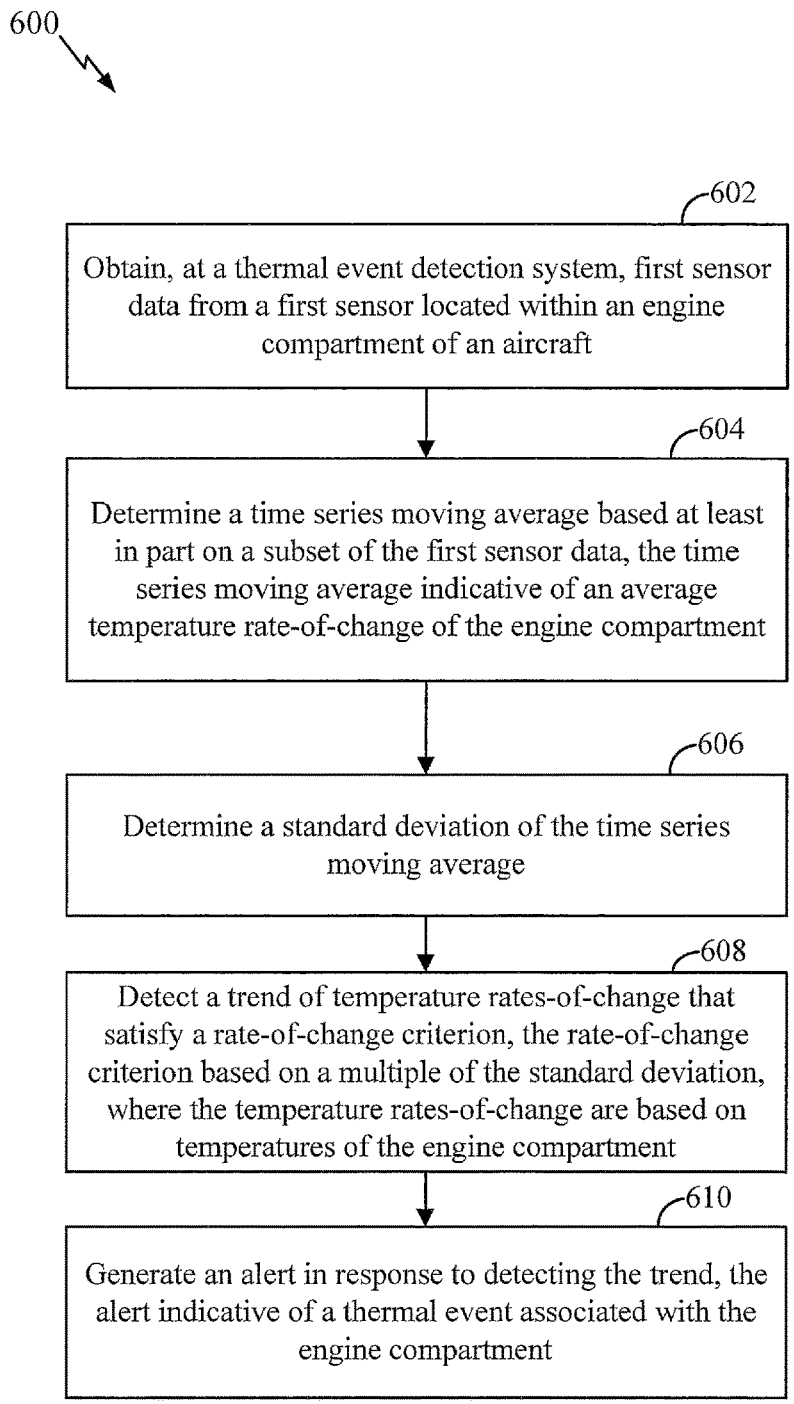
FIG. 6 is a method for monitoring thermal events in an aircraft engine compartment.

Referring to FIG. 6, a method 600 for monitoring thermal events in an aircraft engine compartment is shown. The method 600 may be performed by the one or more components of the thermal event detection system 150 of FIG. 1.

The method 600 includes obtaining, at a thermal event detection system, first sensor data from a first sensor located within an engine compartment of an aircraft, at 602. For example, referring to FIG. 1, the thermal event detection system 150 (e.g., a processor) may receive the sensor data 114, 115, 116 from the sensor 110 at the location 112. The first sensor data include resistance values (measured in Ohms) that are indicative of temperatures, as illustrated in FIG. 2. According to one implementation, the method 600 may include obtaining second sensor data from a second sensor located within the engine compartment. For example, the thermal event detection system 150 may receive the sensor data 124, 125, 126 from the sensor 120 at the location 122. The first sensor and the second sensor may be included in a plurality of sensors 110, 120, 130, 140 within the engine compartment 100.

The method 600 also includes determining a times series moving average based at least in part on a subset of the first sensor data, at 604. The time series moving average may be indicative of an average temperature rate-of-change of the engine compartment. For example, referring to FIG. 1, the moving average determination unit 154 may determine the time series moving average 164 indicative of an average temperature rate-of-change. Determining the tune series moving average 164 may include iteratively averaging temperature rates-of-change associated with the engine compartment for a plurality of different time periods. The time series moving average 164 may be based on a subset of the first sensor data and a subset of the second sensor data (e.g., the sensor data 124, 125, 126). The subset of the first sensor data may correspond to a time ordered subset of consecutive sensor data (ten consecutive sensor data values, for example), where the subset of sensor data is incrementally updated, for determining the time series moving average from data obtained from the first sensor (e.g., the sensor 110) for at least thirty minutes, and the subset of the first sensor data may be received at intervals that are less than or equal to five seconds.

The method 600 also includes determining a standard deviation of the time series moving average, at 606. For example, referring to FIG. 1, the deviation determination unit 155 may determine the standard deviation 166 of the times series moving average 164 for the engine compartment 100.

The method 600 also includes detecting a trend of temperature rates-of-change that satisfy a rate-of-change criterion, at 608. The rate-of-change criterion may be based on a multiple of the standard deviation, and the temperature rates-of-change may be based on temperatures of the engine compartment. For example, referring to FIG. 1, the deviation determination unit 155 may determine the rate-of-change criterion 168 based on the standard deviation 166. To illustrate, the rate-of-change criterion 168 may be a multiple of the standard deviation 166. The multiple may be between two and four. According to one implementation, the multiple may be three. The trend identification unit 157 may detect the trend in response to a particular percentage of detected temperature rates-of-change within a particular time period satisfying the rate-of-change criterion 168. According to one implementation, the particular percentage may be greater than fifty percent and less than or equal to one-hundred percent. According to one implementation, the particular time period may be at least five seconds.

The method 600 also includes generating an alert in response to detecting the trend, at 610. The alert may be indicative of a thermal event associated with the engine compartment. For example, referring to FIG. 1, the alert generator 158 may generate an alert for maintenance to schedule troubleshooting or inspection. Thus, by identifying trends of substantially large temperature rates-of-change in comparison to the standard deviation 166 of the time series moving average 164, the thermal event detection system 150 may generate an alert to schedule troubleshooting or inspection.

According to one implementation of the method 600, the average rate-of-change is based on positive temperature rates-of-change, and the trend is detected in response to the detected temperature rates-of-change exceeding the rate-of-change criterion. According to another implementation of the method 600, the average temperature rate-of-change is based on negative temperature rates-of-change, and the trend is detected in response to the detected temperature rates-of-change failing to exceed the rate-of-change criterion.

The method 600 of FIG. 6 may facilitate scheduling of troubleshooting or inspections in response to detection of a trend of high temperature rates-of-change. For example, an alert may be generating in response to detection of the trend, and a subsequent inspection may occur in response to the alert.

Figure 7:
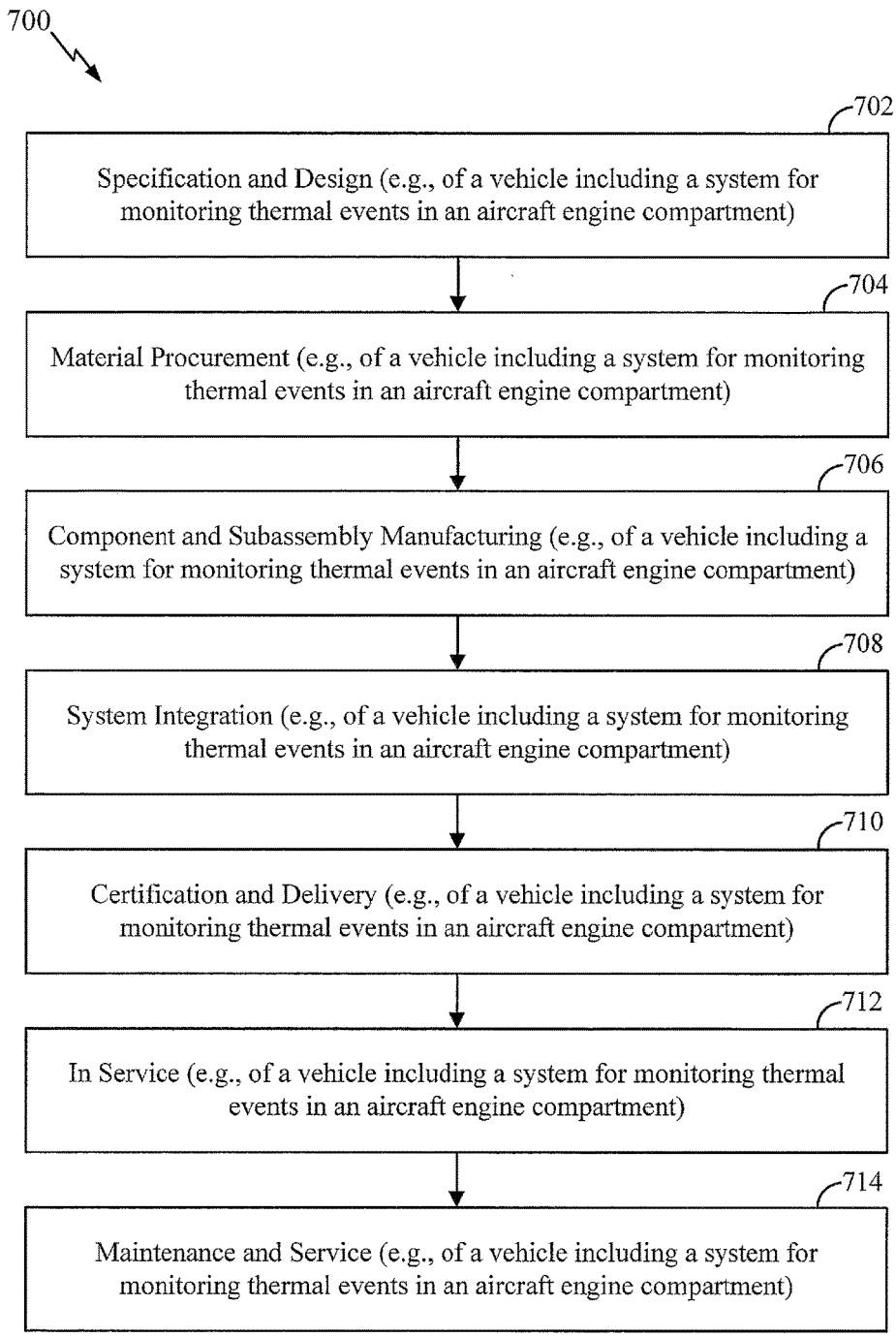
FIG. 7 is a flowchart of an example of a method of operating a system for monitoring events in an aircraft engine compartment.

Referring to FIG. 7, a flowchart of an illustrative example of a method of operating a system for monitoring thermal events in an aircraft engine compartment (e.g., a thermal event detection system) is shown and designated 700. During pre-production, the exemplary method 700 includes, at 702, specification and design of a vehicle, such as aircraft or a vehicle 802 described with reference to FIG. 8. During the specification and design of the vehicle, the method 700 may include specifying a plurality of sensors and a thermal event detection system, or a combination thereof. The plurality of sensors and a thermal event detection system may include or correspond to the sensors 110, 120, 130, 140 and the thermal event detection system 150, respectively. At 704, the method 700 includes material procurement. For example, the method 700 may include procuring materials (the plurality of sensor and the thermal event detection system) for the thermal event detection system.

During production, the method 700 includes, at 706, component and subassembly manufacturing and, at 708, system integration of the vehicle. The method 700 may include component and subassembly manufacturing (e.g., producing the sensors 110, 120, 130, 140, the thermal event detection system 150, or a combination thereof) of the thermal event detection system and system integration (e.g., coupling the sensors 110, 120, 130, 140 to the thermal event detection system 150) of the system for monitoring thermal events the aircraft engine department. At 710, the method 700 includes certification and delivery of the vehicle and, at 712, placing the vehicle in service. Certification and delivery may include certifying the thermal event detection system. The method 700 may include placing the thermal event detection system in service. While in service by a customer, the vehicle may be scheduled for routine maintenance and service (which may also include modification, reconfiguration, refurbishment, and so on). At 714, the method 700 includes performing maintenance and service on the vehicle. The method 700 may include performing maintenance and service of the thermal event detection system. For example, maintenance and service of the thermal event detection system may include replacing one or more of the sensors 110, 120, 130, 140, the thermal event detection system 150, or a combination thereof.

Each of the processes of the method 700 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Figure 8:
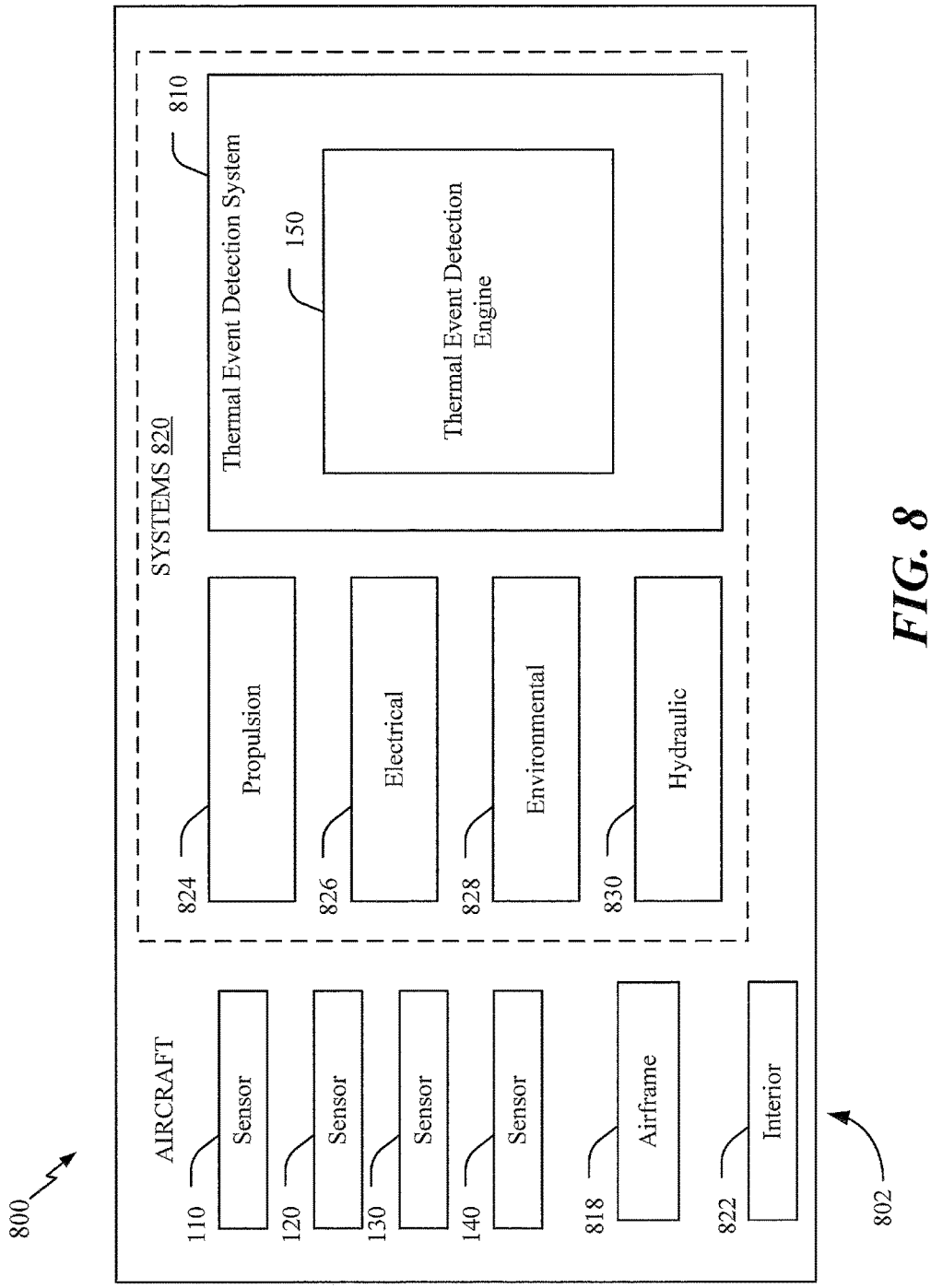
FIG. 8 is a block diagram of an illustrative implementation of a vehicle that includes a system for monitoring events in an aircraft engine compartment.

Referring to FIG. 8, a block diagram of an illustrative implementation of a vehicle that includes components of a system for monitoring thermal events in an aircraft engine compartment is shown and designated 800. They system 800 includes a vehicle 802. The vehicle 802 may include an aircraft, as an illustrative, non-limiting example. The vehicle 802 may have been produced by at least a portion of the method 700 of FIG. 7. The vehicle 802 (e.g., an aircraft) may include the sensors 110, 120, 130, 140, the thermal event detection system 150, an airframe 818, an interior 822, and a plurality of systems 820 including a thermal event detection system 810. The plurality of systems 820 may additionally include one or more of a propulsion system 824, an electrical system 826, an environmental system 828, or a hydraulic system 830. The thermal event detection system 810 may include the thermal event detection system 150. Additionally, any number of other systems may be included, such as a memory (not shown). The memory may include or correspond to the memory 151 of FIG. 1. The thermal event detection system 150 may be configured to execute computer-executable instructions (e.g., a program of one or more instructions) stored in the memory 151. The instructions, when executed, cause the thermal event detection system 150 (e.g., a processor) to perform one or more operations of the methods 600-700 of FIGS. 6-7.

Apparatus and methods included herein may be employed during any one or more of the stages of the method 700 of FIG. 7. For example, components or subassemblies corresponding to production process 708 may be fabricated or manufactured in a manner similar to components or subassemblies produced while the vehicle 802 is in service, at 712 for example and without limitation. Also, one or more apparatus implementations, method implementations, or a combination thereof may be utilized during the production stages (e.g., stages 702-710 of the method 700), for example, by substantially expediting assembly of or reducing the cost of the vehicle 802. Similarly, one or more of apparatus implementations, method implementations, or a combination thereof, may be utilized while the vehicle 802 is in service, at 712 for example and without limitation, to maintenance and service, at 714.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method for monitoring thermal events in an aircraft engine compartment, the method comprising:
   obtaining, at a thermal event detection system, a subset of first sensor data from a first sensor located within an engine compartment of an aircraft;
   determining a time series moving average based at least in part on the subset of the first sensor data, the time series moving average indicative of an average temperature rate-of-change of the engine compartment;
   determining a standard deviation of the time series moving average;
   detecting a trend of temperature rates-of-change that satisfy a rate-of-change criterion, the rate-of-change criterion based on a multiple of the standard deviation, wherein the temperature rates-of-change are based on temperatures of the engine compartment; and
   generating an alert in response to detecting the trend, the alert indicative of a thermal event associated with the engine compartment.

2. The method of claim 1, further comprising obtaining a subset of second sensor data from a second sensor located within the engine compartment, wherein the time series moving average is further based at least in part on the subset of the second sensor data.

3. The method of claim 2, wherein the first sensor and the second sensor are included in a plurality of sensors located within the engine compartment.

4. The method of claim 1, wherein determining the time series moving average comprises iteratively averaging temperature rates-of-change associated with the engine compartment for a plurality of different time period.

5. The method of claim 1, wherein the multiple is between two and four.

6. The method of claim 1, wherein the trend is detected in response to a particular percentage of determined temperature rates-of-change within a particular time period satisfying the rate-of-change criterion.

7. The method of claim 6, wherein the particular percentage is greater than fifty percent and less than or equal to one-hundred percent.

8. The method of claim 7, wherein the particular time period is at least five seconds.

9. The method of claim 1, wherein the average temperature rate-of-change is based on a positive rate-of-change of temperature, and wherein the trend is detected in response to the determined temperature rates-of-change exceeding the rate-of-change criterion.

10. The method of claim 1, wherein the average temperature rate-of-change is based on a negative rate-of-change of temperature, and wherein the trend is detected in response to the determined temperature rates-of-change failing to exceed the rate-of-change criterion.

11. The method of claim 1, wherein the first sensor data includes resistance values indicative of temperatures.

12. The method of claim 1, wherein the subset of the first sensor data corresponds to a time-ordered set of consecutive values from the data obtained from the first sensor for at least thirty minutes.

13. The method of claim 12, wherein the first sensor data is received at intervals that are less than or equal to five seconds.

14. An aircraft comprising:
   a first sensor located within an engine compartment, the first sensor configured to generate first sensor data indicative of temperature; and
   a thermal event detection unit in communication with the first sensor and configured to:
      determine a time series moving average based at least in part on a subset of the first sensor data, the time series moving average indicative of an average temperature rate-of-change of the engine compartment;
      determine a standard deviation of the time series moving average;
      detect a trend of temperature rates-of-change that satisfy a rate-of-change criterion, the rate-of-change criterion based on a multiple of the standard deviation, wherein the temperature rates-of-change are based on temperatures of the engine compartment; and
      generate an alert in response to detecting the trend, the alert indicative of the thermal event associated with the engine compartment.

15. The aircraft of claim 14, further comprising a second sensor located within engine compartment, the second sensor configured to generate second sensor data indicative of temperature, and wherein the time series moving average is further based at least in part on a subset of the second sensor data.

16. The aircraft of claim 15, wherein the first sensor and the second sensor are included in a plurality of sensors located within the engine compartment.

17. The aircraft of claim 14, wherein determining the time series moving average comprises iteratively averaging temperature rates-of-change associated with the engine compartment for a plurality of different time period.

18. The aircraft of claim 14, wherein the trend is detected in response to a particular percentage of determined temperature rates-of-change within a particular time period satisfying the rate-of-change criterion.

19. A non-transitory computer-readable medium comprising instructions for monitoring thermal events in an aircraft engine compartment, the instructions, when executed by a processor, cause the processor to perform operations comprising:
   obtaining first sensor data from a first sensor located within an engine compartment of an aircraft;
   determining a time series moving average based at least in part on a subset of the first sensor data, the time series moving average indicative of an average temperature rate-of-change of the engine compartment;
   determining a standard deviation of the time series moving average;
   detecting a trend of temperature rates-of-change that satisfy a rate-of-change criterion, the rate-of-change criterion based on a multiple of the standard deviation, wherein the temperature rates-of-change are based on temperatures of the engine compartment; and
   generating an alert in response to detecting the trend, the alert indicative of a thermal event associated with the engine compartment.

20. The non-transitory computer-readable medium of claim 19, wherein the trend is detected in response to a particular percentage of determined temperature rates-of-change within a particular time period satisfying the rate-of-change criterion.

* * * * *

UNITED STATES PATENT AND TRADEMARK OFFICE
CERTIFICATE OF CORRECTION

PATENT NO. : 10,151,643 B2
APPLICATION NO. : 15/243275
DATED : December 11, 2018
INVENTOR(S) : Eric B. Gilbert Page 1 of 1

It is certified that error appears in the above-identified patent and that said Letters Patent is hereby corrected as shown below:

In the Claims

Column 15, Claim 4, Line 35, "period" should read --periods--.

Column 16, Claim 15, Line 23, after "located within" insert --the--.

Column 16, Claim 17, Line 34, "period" should read --periods--.

Signed and Sealed this
Twelfth Day of February, 2019

Andrei Iancu
*Director of the United States Patent and Trademark Office*